Patented Sept. 15, 1953

2,652,407

UNITED STATES PATENT OFFICE 2,652,407

FRACTIONAL ESTERS OF POLYOXYALKYL-ATED FURFURYLAMINE

Melvin De Groote, University City, Mo., assignor to Petrolite Corporation, a corporation of Delaware No Drawing. Application May 14, 1951, Serial No. 226,321

7 Claims. (Cl. 260—347.4)

The present invention is concerned with certain new chemical products, compounds, or compositions which have useful application in various arts. It includes methods or procedures for manufacturing said new chemical products, compounds or compositions, as well as the products, compounds, or compositions themselves.

Complementary to the above aspect of the invention herein disclosed is my companion invention concerned with the use of these particular chemical compounds, or products, as demulsifying agents in processes or procedures particularly adapted for preventing, breaking or resolving emulsions of the water-in-oil type, and particularly petroleum emulsions. See my co-pending application, Serial No. 226,320, filed May 14, 1951.

Said new compositions are fractional esters obtained from a polycarboxy acid and a nitrogen-containing diol obtained by the oxypropylation of furfurylamine. The dihydroxylated compound prior to esterification must be water-insoluble and kerosene-soluble. Momentarily ignoring certain variants of structure which will be considered subsequently, the demulsifier may be exemplified by the following formula:

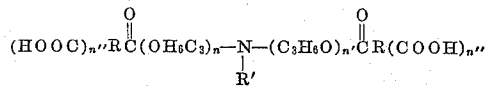

in which R' is a furfuryl radical, and $n$ and $n'$ are whole numbers with the proviso that $n$ plus $n'$ equals a sum varying from 15 to 80; $n''$ is a whole number not over 2, and R is the radical of the polycarboxy acid

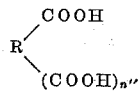

and preferably free from any radical having more than 8 uninterrupted carbon atoms in a single group, and with the further proviso that the parent dihydroxy compound, prior to esterification, be water-insoluble and kerosene-soluble.

The structure for furfurylamine is as follows:

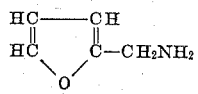

Attention is directed to the co-pending application of Charles M. Blair, Jr., Serial No. 70,811, filed January 13, 1949, in which there is described, among other things, a process for breaking petroleum emulsions of the water-in-oil type characterized by subjecting the emulsion to the action of an esterification product of a dicarboxylic acid and a polyalkylene glycol, in which the ratio of equivalents of polybasic acid to equivalents of polyalkylene glycol is in the range of 0.5 to 2.0, in which the alkylene group has from 2 to 3 carbon atoms, and in which the molecular weight of the product is between 1,500 to 4,000.

Similarly, there have been used esters of dicarboxy acids and polypropylene glycols, in which 2 moles of the dicarboxy acid ester have been reacted with one mole of a polypropylene glycol having a molecular weight, for example, of 2,000 so as to form an acidic fractional ester. Subsequent examination of what is said herein, in comparison with the previous example as well as the hereto appended claims, will show the line of delineation between such somewhat comparable compounds. Of greater significance, however, is what is said subsequently in regard to the structure of the parent diol, as compared to polypropylene glycols whose molecular weights may vary from 1,000 to 2,000.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in my co-pending application, Serial No. 226,320, filed May 14, 1951.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

For convenience, what is said hereinafter will be divided into four parts:

Part 1 is concerned with the preparation of the oxypropylation derivatives of the specified amine.

Part 2 is concerned with the preparation of the esters from the oxypropylated derivatives;

Part 3 is concerned with the structure of the oxypropylation products obtained from the specified amine. Insofar that such materials are dihydroxylated, there is a relationship to ordinary diols which do not contain a nitrogen atom, all of which is considered briefly in this particular part; and Part 4 is concerned with derivatives valuable for various purposes, including demulsification, but not specifically claimed in the instant application.

PART I

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size, the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions not only in regard to presence or absence of catalyst and the kind of catalyst but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water, or slightly above, as, for example, 95° to 120° C. Under such circumstances the pressure will be less than 30 pounds per square inch unless some special procedure is employed as is sometimes the case to wit, keeping an atmosphere of inert gas such as nitrogen in the vessel during the reaction. Such low-temperature low-reaction-rate oxypropylations have been described very completely in U. S. Patent No. 2,448,664, to H. R. Fife et al., dated September 7, 1948. Low-temperature low-pressure oxypropylations are particularly desirable where the compound being subjected to oxypropylation contains one, two or three points of reaction only, such as monohydric alcohols, glycols and triols.

Since low-pressure low-temperature low-reaction speed oxypropylations require considerable time, for instance, 1 to 7 days of 24 hours each to complete the reaction, they are conducted as a rule whether on a laboratory scale, pilot plant scale, or large scale, so as to operate automatically. The prior figure of seven days applies especially to large-scale operations. I have used conventional equipment with two added automatic features:

(a) A solenoid-controlled valve which shuts off the propylene oxide in event that the temperature gets outside a predetermined and set range, for instance, 95° to 120° C.; and (b) Another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose, where the pressure of reaction is higher, speed of reaction is higher, and time of reaction is shorter. In such instances such automatic controls are not necessarily used.

Thus, in preparing the various examples I have found it particularly advantageous to use laboratory equipment or pilot plant equipment which is designed to permit continuous oxyalkylations, whether it be oxypropylation or oxyethylation. With certain obvious changes, the equipment can be used also to permit oxyalkylation involving the use of glycide, where no pressure is involved except the vapor pressure of a solvent, if any, which may have been used as a diluent.

As previously pointed out, the method of using propylene oxide is the same as ethylene oxide. This point is emphasized only for the reason that the apparatus is so designed and constructed as to use either oxide.

The oxypropylation procedure employed in the preparation of the axyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds' gauge pressure. This pressure obviously is far beyond any requirement as far as propylene oxide goes, unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line, charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and preferably coils in addition thereto, with the jacket so arranged that it is suitable for heating with steam or cooling with water, and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves the container consists essentially of a laboratory bomb having a capacity of about one-half gallon, or somewhat in excess thereof. In some instances a larger bomb was used, to wit, one having a capacity of about one gallon. This bomb was equipped also with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line which was used to pressure the bomb reservoir. To the extent that it was required any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform, in that the reaction temperature was held within a few degrees of any selected point, for instance, if 105° C. was selected as the operating temperature the maximum point would be at the most 110° C. or 112° C., and the lower point would be 95°, or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxalkylations at 200° C. Numerous reactions were conducted in which the time varied from one day to two days for the completion of the final series. In some instances the reaction takes place in considerably less time, for instance, just part of a day. The minimum time recorded in the subsequent series was 8 hours and the maximum time 14 hours. However, reactions indicated as being complete in 10 hours, for example, may have been complete in a lesser period of time in light of the automatic equipment employed. This applies also where the reactions were indicated as being complete in a shorter period of time, for instance, 8 hours.

In the addition of propylene oxide in the autoclave equipment as far as possible the valves were set so all the propylene oxide if fed continuously would be added at a rate so that the predetermined amount would react within the first 15 hours of the 24-hour period, or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period, there would be an unquestionable speeding up of the reaction by simply repeating the examples and using 3, 4 or 5 hours instead of 10 hours.

When operating at a comparatively high temperature, for instance, between 150° to 200° C., an unreacted alkylene oxide, such as propylene oxide, makes its presence felt in the increase in pressure or the consistency of a higher pressure. However, at a low enough temperature it may happen that the propylene oxide goes in as a liquid. If so, and if it remains unreacted, there is, of course, an inherent danger and appropriate steps must be taken to safeguard against this possibility; if need be, a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight, the faster the reaction takes place. For this reason, sometimes at least, increasing the concentration of the catalyst does not appreciably speed up the reaction particularly when the product subjected to oxyalkylation has a comparatively high molecular weight. However, as has been pointed out previously, operating at a low pressure and a low temperature, even in large scale operations, as much as a week or ten days' time may elapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time-operating device was set for either one to two hours, so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic, insofar that the feed stream was set for a slow continuous run which was shut off in case the pressure passed a predetermined point, as previously set out. All the points of design, construction, etc., were conventional, including the gauges, check valves and entire equipment. As far as I am aware, at least two firms and possibly three, specialize in autoclave equipment such as I have employed in the laboratory and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

*Example 1a*

The starting material was a commercial grade of furfurylamine as sold in the open market. This particular product was obtained from the Commercial Solvents Corporation, Terre Haute, Indiana. The particular autoclave employed was one with a capacity of 15 gallons or on the average of about 125 pounds of reaction mass. The speed of the stirrer could be varied from 150 to 350 R. P. M.

8.37 pounds of furfurylamine were charged into the autoclave along with .75 pound of caustic soda. The reaction pot was flushed out with nitrogen, the autoclave sealed, and the automatic devices adjusted for injecting 85.25 pounds of propylene oxide in approximately a 10-hour period. The regulator was set for a maximum of 25 to 35 pounds per square inch. This meant that the bulk of the reaction could take place, and probably did take place, at a lower pressure. In fact, the bulk of the reaction took place at a pressure of not over 30 pounds per square inch. This comparatively low pressure was the result of the fact that considerable catalyst was present, especially when one allows for the fact that furfurylamine has substantial basicity of its own.

The addition of the propylene oxide was fairly slow, about 10 or 11 pounds per hour. The addition was made at moderately above the boiling point of water, i. e., 240° to 250° F. The initial introduction of propylene oxide was not made until the heating devices had raised the temperature to somewhat above the boiling point of water, for instance, 225° to 230° F.

At the completion of the reaction a sample was taken and oxypropylation proceeded as in Example 2a, immediately following.

Example 2a 55.62 pounds of the reaction mass identified as Example 1a, preceding, and equivalent to 4.94 pounds of the amine, 50.23 pounds of propylene oxide, and .45 pound of caustic soda, were allowed to remain in the reaction vessel and without adding any more catalyst subjected to reaction with 34 pounds of propylene oxide. The oxypropylation was conducted in substantially the same manner in regard to temperature and pressure as in Example 1, preceding. This applies, also, to Examples 3a and 4a, following.

The oxide was added in a somewhat shorter period of time, to wit, 8 hours. The rate of addition was at about 6 pounds per hour. At the end of the reaction part of the sample was withdrawn and oxypropylation was continued as described in Example 3a, following.

Example 3a 52.87 pounds of reaction mass identified as Example 2a, preceding, and equivalent to 2.91 pounds of the amine, 49.70 pounds of propylene oxide, and .26 pound of caustic soda, were permitted to remain in the autoclave. Without adding any more catalyst this was subjected to further oxypropylation in the same manner as in the preceding examples. 22.75 pounds of propylene oxide were added. The addition was made in a 10-hour period. The rate was about 2½ to 3 pounds per hour. At the end of the reaction period part of the sample was withdrawn and the remainder of the reaction mass subjected to further oxypropylation as described in Example 4a, immediately following.

Example 4a 43.62 pounds of the reaction mass identified as Example 3a, preceding, and equivalent to 1.68 pounds of the amine, 41.79 pounds of propylene oxide, and .15 pound of caustic soda, were subjected to further oxypropylation. No additional catalyst was added. 20.75 pounds of propylene oxide were added without the use of any additional catalyst. The time required to add this amount of oxide was 14 hours. The rate of addition was about 1½ pounds per hour. This reaction went rather slowly at this stage due to the low concentration of catalyst.

In this particular series the oxypropylation was stopped at this stage, so that the theoretical molecular weight was in the neighborhood of 3,000, and the hydroxyl molecular weight in the neighborhood of 2,000. In other series I have added enough propylene oxide to give a theoretical molecular weight of 6,000 to 10,000 and higher based on the assumption that there is complete reaction, with hydroxyl molecular weights running as high as 4,000 to 5,000 or higher.

What is said hereinafter is presented in tabular form in Table 1 immediately following, with some added information as to the molecular weight and as to solubility of the reaction product in water, kerosene and xylene.

TABLE 1

| Ex. No. | Composition before ||| Composition at end |||||  Max. temp., °F. | Max. Pres., lbs. sq. in. | Time, hrs. |
|---|---|---|---|---|---|---|---|---|---|---|---|
|  | Amine amt., lbs. | Oxide amt., lbs. | Catalyst, lbs. | Theo. mol. wt. | Amine amt., lbs. | Oxide amt., lbs. | Catalyst, lbs. | Solvent amt., lbs. |  |  |  |
| 1a | 8.37 |  | 0.75 | 880 | 8.37 | 85.25 | 0.75 | 783 | 240–250 | 25–35 | 10 |
| 2a | 4.94 | 50.23 | .45 | 1,425 | 4.94 | 84.23 | .45 | 1,140 | 240–250 | 25–35 | 8 |
| 3a | 2.91 | 49.70 | .26 | 2,045 | 2.91 | 72.45 | .26 | 1,726 | 240–250 | 25–35 | 10 |
| 4a | 1.68 | 41.79 | .15 | 3,025 | 1.68 | 62.54 | .15 | 2,040 | 240–250 | 25–35 | 14 |

All the above examples were insoluble in water, and soluble in both xylene and kerosene.

The final product, i. e., at the end of the oxypropylation step, was a somewhat viscous liquid with amber to reddish-amber cast. This was characteristic of all the various products obtained. These products were, of course, slightly alkaline due to the residual caustic soda and also due to the basic nitrogen atom. The residual basicity, due to the catalyst, would of course be the same if sodium methylate had been used.

Speaking of insolubility in water or solubility in kerosene, such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances, the acetyl value or hydroxyl value serves as satisfactorily as an index to the molecular weight as any other procedure, subject to the above limitations, and especially in the higher molecular weight range. If any difficulty is encountered in the manufacture of the esters, as described in Part 2, the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out, the present invention is concerned with acidic esters obtained from the propylated derivatives described in Part 1, immediately preceding, and polycarboxy acids, particularly tricarboxy acid like citric and dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts, as obtained by the Diels-Alder reaction from products such as maleic anhydride, and cyclopentadiene. Such acids should be heat-stable so they are not decomposed during esterification. They may contain as many as 36 carbon atoms, as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy, it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as paratoluene sulfonic acid as a catalyst. There is some objection to this, because, in some instances, there is some evidence that this acid catalyst tends to decompose or rearrange heat-oxypropylated compounds, and particularly likely to do so, if the esterification temperature is too high. In the case of polycarboxy acids such as diglycollic acid, which is strongly acidic, there is no need to add any catalyst. The use of hydrochloric acid gas has one advantage over para-toluene sulfonic acid and that is that at the end of the reaction, it can be removed by flushing out with nitrogen, whereas, there is no reasonably convenient means available of removing the para-toluene sulfonic acid or other sulfonic acid employed. If hydrochloric acid is employed, one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever.

The products obtained in Part 1 preceding may contain a basic catalyst. As a general procedure, I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required. In any event, the neutral or slightly acidic solution of the oxypropylated derivatives described in Part 1 is then diluted further with sufficient xylene decalin, petroleum solvent, or the like, so that one has obtained approximately a 40% solution. To this solution there is added a polycarboxylated reactant, as previously described, such as phthalic anhydride, succinic acid or anhydride, diglycollic acid, etc. The mixture is refluxed until esterification is complete, as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent, or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear, somewhat viscous, reddish-amber to amber liquid so obtained may contain a small amount of sodium sulfate or sodium chloride, but, in any event, is perfectly acceptable for esterification in the manner described.

It is to be pointed out that the products here described are not polyesters in the sense that there is a plurality of both diol radicals and acid radicals; the product is characterized by having only one diol radical.

Various solvents have been used but it will be noted in the examples included herewith that xylene and no other solvent has been employed. I have found xylene to be very satisfactory. The procedure is perfectly obvious and no further explanation appears necessary.

The data included in the subsequent tables, i. e., Tables 2 and 3, are self-explanatory and very complete and it is believed no further elaboration is necessary.

TABLE 2

| Ex. No. of acid ester | Ex. No of oxy. cmpd. | Theo. M. W. of H. C. | Theo. hydroxyl V. of H. C. | Actual hydroxyl value | Mol. wt. based on actual H. V. | Amt. of hyd. cmpd. (grs.) | Polycarboxy reactant | Amt. of polycarboxy reactant (grs.) |
|---|---|---|---|---|---|---|---|---|
| 1b | 1a | 880 | 128 | 143 | 788 | 190 | Diglycolic acid | 64.5 |
| 2b | 1a | 880 | 128 | 143 | 788 | 191 | Aconitic acid | 84.0 |
| 3b | 1a | 880 | 128 | 143 | 788 | 189 | Oxalic acid | 60.5 |
| 4b | 1a | 880 | 128 | 143 | 788 | 191 | Phthalic anhydride | 71.5 |
| 5b | 1a | 880 | 128 | 143 | 788 | 190 | Maleic anhydride | 47.3 |
| 6b | 2a | 1,425 | 78.8 | 98.5 | 1,140 | 198 | Diglycolic acid | 46.6 |
| 7b | 2a | 1,425 | 78.8 | 98.5 | 1,140 | 199 | Aconitic acid | 60.5 |
| 8b | 2a | 1,425 | 78.8 | 98.5 | 1,140 | 198 | Oxalic acid | 43.9 |
| 9b | 2a | 1,425 | 78.8 | 98.5 | 1,140 | 200 | Phthalic anhydride | 37.3 |
| 10b | 2a | 1,425 | 78.8 | 98.5 | 1,140 | 201 | Maleic anhydride | 24.7 |
| 11b | 2a | 1,425 | 78.8 | 98.5 | 1,140 | 200 | Citraconic anhydride | 28.2 |
| 12b | 3a | 2,045 | 54.9 | 65.0 | 1,726 | 200 | Diglycolic acid | 31.1 |
| 13b | 3a | 2,045 | 54.9 | 65.0 | 1,726 | 200 | Aconitic acid | 34.4 |
| 14b | 3a | 2,045 | 54.9 | 65.0 | 1,726 | 200 | Oxalic acid | 29.2 |
| 15b | 3a | 2,045 | 54.9 | 65.0 | 1,726 | 200 | Phthalic anhydride | 34.4 |
| 16b | 3a | 2,045 | 54.9 | 65.0 | 1,726 | 200 | Maleic anhydride | 22.8 |
| 17b | 3a | 2,045 | 54.9 | 65.0 | 1,726 | 202 | Citraconic anhydride | 26.2 |
| 18b | 4a | 3,025 | 37.1 | 55.0 | 2,040 | 201 | Diglycolic acid | 26.4 |
| 19b | 4a | 3,025 | 37.1 | 55.0 | 2,040 | 205 | Oxalic acid | 25.3 |
| 20b | 4a | 3,025 | 37.1 | 55.0 | 2,040 | 200 | Aconitic acid | 34.1 |
| 21b | 4a | 3,025 | 37.1 | 55.0 | 2,040 | 201 | Phthalic anhydride | 29.2 |
| 22b | 4a | 3,025 | 37.1 | 55.0 | 2,040 | 200 | Maleic anhydride | 19.2 |
| 23b | 4a | 3,025 | 37.1 | 55.0 | 2,040 | 201 | Citraconic anhydride | 22.0 |

TABLE 3

| Ex. No. of acid ester | Solvent | Amt. solvent (grs.) | Esterification temp., ° C. | Time of esterification (hrs.) | Water out (cc.) |
|---|---|---|---|---|---|
| 1b | Xylene | 246 | 139 | 8¾ | 8.0 |
| 2b | do | 266 | 146 | 7 | 8.7 |
| 3b | do | 224 | 141 | 3 | 26.5 |
| 4b | do | 271 | 148 | 3 | |
| 5b | do | 237 | 140 | 3 | |
| 6b | do | 238 | 147 | 18 | 6.0 |
| 7b | do | 254 | 142 | 12 | 5.5 |
| 8b | do | 223 | 143 | 4 | 19.5 |
| 9b | do | 237 | 148 | 8 | |
| 10b | do | 226 | 148 | 3¼ | |
| 11b | do | 228 | 145 | 3¼ | |
| 12b | do | 227 | 148 | 11½ | 4.4 |
| 13b | do | 230 | 143 | 11½ | 3.8 |
| 14b | do | 216 | 143 | 2½ | 13.1 |
| 15b | do | 234 | 144 | 5¾ | |
| 16b | do | 223 | 145 | 3 | |
| 17b | do | 228 | 146 | 3 | |
| 18b | do | 223 | 147 | 10½ | 3.5 |
| 19b | do | 219 | 143 | 2¼ | 11.5 |
| 20b | do | 230 | 148 | 10 | 3.5 |
| 21b | do | 230 | 148 | 5¼ | |
| 22b | do | 219 | 148 | 5¼ | |
| 23b | do | 223 | 143 | 5¼ | |

The procedure for manufacturing the esters has been illustrated by preceding examples. If, for any reason, reaction does not take place in a manner that is acceptable, attention should be directed to the following details:

(a) Recheck the hydroxyl or acetyl value of the oxypropylated primary amines of the kind specified and use a stoichiometrically equivalent amount of acid;

(b) If the reaction does not proceed with reasonable speed, either raise the temperature indicated, or else extend the period of time up to 12 or 16 hours, if need be;

(c) If necessary, use ½% of para-toluene sulfonic acid, or some other acid as a catalyst;

(d) If the esterification does not produce a clear product, a check should be made to see if an inorganic salt such as sodium chloride or sodium sulfate is not precipitating out.

Such salt should be eliminated, at least for exploration experimentation, and can be removed by filtering. Everything else being equal, as the size of the molecule increases and the reactive hydroxyl radical represents a smaller fraction of the entire molecule, more difficulty is involved in obtaining complete esterification.

Even under the most carefully controlled condition of oxypropylation involving comparatively low temperatures and long time of reaction, there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances, an attempt to react the stoichiometric amount of a polycarboxy acid with the oxypropylated derivative results in an excess of the carboxylated reactant, for the reason that apparently under conditions of reaction, less reactive hydroxyl radicals are present than indicated by the hydroxyl value. Under such circumstances, there is simply a residue of the carboxylic reactant which can be removed by filtration, or, if desired, the esterification procedure can be repeated, using an appropriately reduced ratio of carboxylic reactant.

Even the determination of the hydroxyl value and conventional procedure leaves much to be desired, due, either to the cogeneric materials previously referred to, or, for that matter, the presence of any inorganic salts or propylene oxide. Obviously, this oxide should be eliminated.

The solvent employed, if any, can be removed from the finished ester by distillation, and particularly vacuum distillation. The final products or liquids are generally pale reddish amber to reddish-black in color, and show moderate viscosity. They can be bleached with bleaching clays, filtering chars, and the like. However, for the purpose of demulsification or the like, color is not a factor and decolorization is not justified.

In the above instances, I have permitted the solvents to remain present in the final reaction mass. In other instances, I have followed the same procedure, using decalin or a mixture of decalin or benzene in the same manner and ultimately removed all the solvents by vacuum distillation. Appearances of the final products are much the same as the dials before esterification, and in some instances were somewhat darker in color and had a more reddish cast and were perhaps somewhat more viscous.

PART 3

Previous reference has been made to the fact that diols (nitrogen-free compounds) such as polypropylene glycol of approximately 2,000 molecular weight, for example, have been esterified with dicarboxy acids and employed as demulsifying agents. The herein described compounds are different from such diols although both, it is true, are high molecular weight dihydroxylated compounds. The instant compounds have present a nitrogen atom and are possibly susceptible to certain changes in structure which are not present in an ordinary diol. It seems reasonable to assume that the orientation of such molecules is affected by the presence of such particular structure insofar that presumably it would lead to association by hydrogen bonding or some other effect.

Regardless of what the difference may be the fact still remains that the compounds of the kind herein described may be, and frequently are, 10%, 15% or 20% better on a quantitative basis than the simpler compound previously described, and demulsify faster and give cleaner oil in many instances. The method of making such comparative tests has been described in a booklet entitled "Treating Oil Field Emulsions," used in the Vocational Training Course, Petroleum Industry Series, of the American Petroleum Institute.

It may be well to emphasize also the fact that oxypropylation does not produce a single compound but a cogeneric mixture. The factor involved is the same as appears if one were oxypropylating a monohydric alcohol or a glycol. Momentarily, one may consider the structure of a polypropylene glycol, such as polypropylene glycol of 2000 molecular weight. Propylene glycol has a primary alcohol radical and a secondary alcohol radical. In this sense the building unit which forms polypropylene glycols is not symmetrical. Obviously, then, polypropylene glycols can be obtained, at least theoretically, in which two secondary alcohol groups are united or a secondary alcohol group is united to a primary alcohol group, etherization being involved, of course, in each instance.

Usually no effort is made to differentiate between oxypropylation taking place, for example, at the primary alcohol radical or the secondary alcohol radical. Actually, when such products are obtained, such as a high molal polypropylene glycol or the products obtained in the manner herein described one does not obtain a single derivative such as $HO(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to U. S. Patent 2,549,434, dated April 17, 1951, to De Groote, Wirtel and Pettingill.

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}OH$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example the molal ratio of the propylene oxide to furfurylamine or other specified amine is 30 to 1. Actually, one obtains products in which $n$ probably varies from 10 to 20, perhaps even further. The average value, however, is 15, assuming, as previously stated, that the reaction is complete. The product described by the formula is best described also in terms of method of manufacture.

PART 4

As pointed out previously, the final product obtained is a fractional ester having free carboxyl radicals. Such product can be used as an intermediate for conversion into other derivatives which are effective for various purposes, such as the breaking of petroleum emulsions of the kind herein described. For instance, such product can be neutralized with an amine so as to increase its water-solubility such as triethanolamine, tripropanolamine, oxyethylated triethanolamine, etc. Similarly, such product can be neutralized with some amine which tends to reduce the water solubility such as cyclohexylamine, benzylamine, decylamine, tetradecylamine, octadecylamine, etc. Furthermore, the residual carboxyl radicals can be esterified with alcohols, such as low molal alcohols, methyl, ethyl, propyl, butyl, etc., and also high molal alcohols, such as octyl, decyl, cyclohexanol, benzyl alcohol, octadecyl alcohol, etc. Such products are also valuable for a variety of purposes due to their modified solubility. This is particularly true where surface-active materials are of value and especially in demulsification of water-in-oil emulsion.

Having thus described my invention, what I claim as new and desire to secure by Letters Patent, is:

1. Hydrophile synthetic products, said hydrophile synthetic products being characterized by the following formula

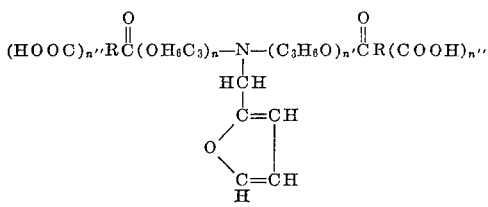

in which $n$ and $n'$ are whole numbers, with the proviso that $n$ plus $n'$ equals a sum varying from 15 to 80; $n''$ is a whole number not over 2 and R is the radical of a polycarboxy acid selected from the group consisting of acyclic and isocyclic polycarboxy acids having not more than 8 carbon atoms and composed of carbon, hydrogen and oxygen of the formula:

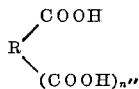

in which $n''$ has its previous significance.

2. Hydrophile synthetic products; said hydrophile synthetic products being characterized by the following formula

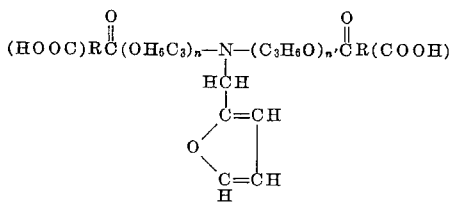

in which $n$ and $n'$ are whole numbers, with the proviso that $n$ plus $n'$ equals a sum varying from 15 to 80; and R is the radical of a dicarboxy acid selected from the group consisting of acyclic and isocyclic dicarboxy acids having not more than 8 carbon atoms and composed of carbon, hydrogen and oxygen of the formula:

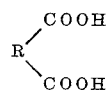

3. The product of claim 2 wherein the dicarboxy acid is phthalic acid.

4. The product of claim 2 wherein the dicarboxy acid is maleic acid.

5. The product of claim 2 wherein the dicarboxy acid is succinic acid.

6. The product of claim 2 wherein the dicarboxy acid is citraconic acid.

7. The product of claim 2 wherein the dicarboxy acid is diglycolic acid.

his
MELVIN × DE GROOTE.
mark

Witnesses to mark:
W. C. ADAMS,
I. S. DE GROOTE.

No references cited.